Jan. 15, 1952 — C. A. CORNELL — 2,582,771

TUBE PATCH

Filed Nov. 10, 1949

INVENTOR
Charles A. Cornell.
BY
Corbett, Mahoney & Miller
ATTORNEYS

UNITED STATES PATENT OFFICE 2,582,771

TUBE PATCH

Charles A. Cornell, Johnstown, Ohio

Application November 10, 1949, Serial No. 126,597

2 Claims. (Cl. 152—367)

My invention relates to a tube patch. It has to do, more particularly, with a rubber patch for use in repairing rubber tubes of the pneumatic type commonly used in automobile and truck tires.

This application is related to my co-pending application, Serial No. 100,789, filed June 23, 1949.

In my said co-pending application, I describe a novel type of two-way tube patch. This patch can be used as a "cold" patch or as a "hot" patch. The patch is made in laminated form with the body layer being formed of cured or vulcanized rubber stock and with an attaching layer of uncured or unvulcanized cushion stock which will contact the tube. These layers do not include any fabric reinforcing so that the patch will have the necessary flexibility to be useful in repairing tubes. This patch has been found to be very satisfactory in repairing pneumatic tubes.

Many injuries to a pneumatic tube positioned in a tire are located beneath or adjacent the bead of the tire, due to pinching or other causes. It is difficult to repair such injuries properly since it is difficult to apply the usual type of patch of circular or square form in such a manner that it will be retained in position during use of the tire. Obviously, if the injury in the tube is under one of the beads of the tire, it is desirable to have sufficient body of the patch over the opening to completely protect it. However, with a round or square patch to obtain sufficient body area for this purpose, it is necessary to have a large patch. If such a large patch is used, it will extend a considerable distance outwardly beyond the bead and, furthermore, it will not have the desired flexibility and will tend to work loose during use of the repaired tube since there is considerable distortion of the tube, especially in a bead-to-bead direction when the truck or car, upon which the tire is mounted, is making turns.

One of the objects of my invention is to provide a tube repair patch which is so designed that it is especially effective in repairing injuries in a tube which are so located that they will be under the bead of the tire in which the tube is to be mounted.

Another object of my invention is to provide a tube patch of the type indicated which is so designed that it will have sufficient body area to cover the injury under the bead but still will not extend upwardly to any extent above the bead and still will have the desired flexibility in both a bead-to-bead direction and a circumferential direction, especially in the former direction and, therefore, will not tend to work loose when the tire is distorted especially in a bead-to-bead direction.

Still another object of my invention is to provide a tube patch of the type indicated above which is designed to obtain the indicated flexibility and as a result of such design also has edges which will not tend to curl.

Various other objects will be apparent.

The preferred embodiment of my invention is illustrated in the accompanying drawing wherein similar characters of reference designate corresponding parts and wherein.

Figure 3:
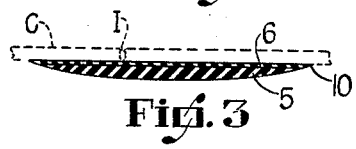
Figure 3 is a transverse sectional view taken along line 3—3 of Figure 2 and showing the structure of the patch.

With reference to the drawing, the structure of the patch of my invention is preferably of the type illustrated in Figure 3. This patch is of laminated form and includes the body layer 5 and the attaching layer 6. The patch preferably has the characteristics of that described in my co-pending application, Serial No. 100,789.

Figure 1:
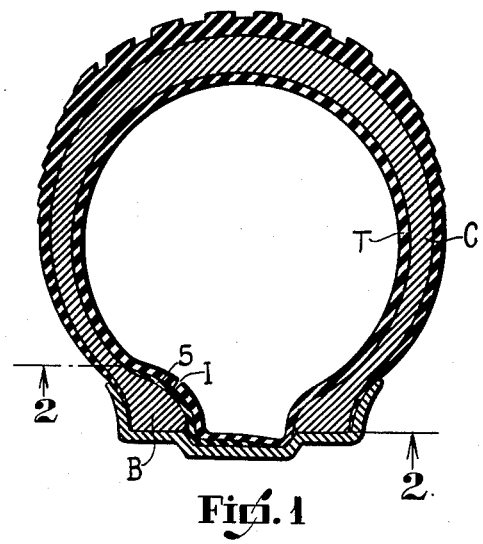
Figure 1 is a transverse sectional view through a tire casing mounted on a rim with a tube positioned therein, the tube having been repaired with a patch designed according to my invention.
Figure 2:
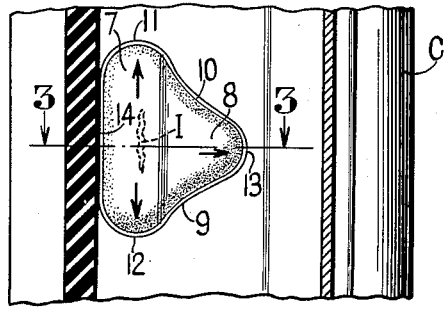
Figure 2 is a horizontal sectional view taken along line 2—2 of Figure 1.

The patch is preferably of the design illustrated in Figure 2. It comprises an injury-covering section 7 and an anchoring tab 8 which are disposed at right angles to each other. The injury-covering section 7 is adapted to extend in a circumferential direction under the tube while the attaching tab 8 is adapted to extend inwardly towards the center of the tube. The tab portion 8 is preferably joined to the section 7 along the curved edges 9 but these joining edges may assume different outlines. However, the entire peripheral edge of the patch is feathered as indicated by the numeral 10. The extreme ends 11 and 12 of the section 7 are rounded as also is the extreme end 13 of the tab 8. The opposite edge of section 7 is straight as indicated at 14.

As previously indicated, the patch is particularly adaptable to the repairing of an injury I in the tube T located directly beneath the bead B of a tire casing C. The body section 7 will be positioned over the injury and will extend in a circumferential direction. It will be noted that since it is long and narrow, it need not extend outwardly to any considerable extent beyond the bead B. The securing or anchoring tab 8 will extend inwardly in a bead-to-bead direction towards the center of the tube. It will be noted that the patch is so designed that the area thereof decreases in all directions, as indicated by the arrows in Figure 2, from the injury except in the direction outwardly from the injury. This will make it extremely flexible in all of the said directions, the flexibility gradually decreasing from the injury to the outer edges of the patch. Therefore, over the injury, the patch will be sufficiently rigid to prevent it from pulling loose from the injury and at the edges it will be sufficiently flexible to gradually absorb the shocks caused by distortion of the tube. When going around a corner, as indicated, the tube will be distorted and most of the resulting forces will be on the side wall of the tube and, consequently, it is desirable to keep the patch located so that it does not extend beyond the bead but the body will be beneath the bead and the attaching portion will extend inwardly over the center of the tube. In this position, the excessive forces on the tube will have a minimum effect on the patch. Tapering the edge of the body 5, as indicated in Figure 3, to obtain the feather edge also aids in producing the flexibility in the patch which is a maximum at its outer edge and gradually decreases towards the center of the patch.

It will be apparent that if the injury is adjacent the other bead of the tire, the patch will be reversed. In other words, the patching tab 8 is always located towards the center of the tube.

It will be apparent from the above description that I have provided a tube repair patch which is especially suitable for use in repairing injuries beneath the bead of a tire casing. Many advantages of this patch have been discussed above and others will be apparent.

Having thus described my invention, what I claim is:

1. A repaired tube mounted in a tire casing including a patch formed solely of rubber material and comprising an elongated injury-covering section disposed on the tube over the injury and beneath the bead and having an outer edge which is substantially straight, said section extending circumferentially and with the straight edge terminating substantially at the upper edge of the bead and having an inwardly extending securing tab of gradually increasing flexibility.

2. A repaired tube according to claim 1 wherein the injury-covering section is of gradually increasing flexibility from the center thereof towards the end thereof.

CHARLES A. CORNELL.

REFERENCES CITED

The following references are of record in the file of this patent:

UNITED STATES PATENTS

| Number | Name | Date |
| --- | --- | --- |
| Re. 17,859 | Dunlap | Nov. 11, 1930 |
| 1,047,790 | Gregg | Dec. 17, 1912 |
| 1,285,719 | Jeffries | Nov. 26, 1918 |
| 1,861,102 | Teer | May 31, 1932 |
| 2,057,798 | Springer | Oct. 20, 1936 |